Patented Apr. 6, 1954

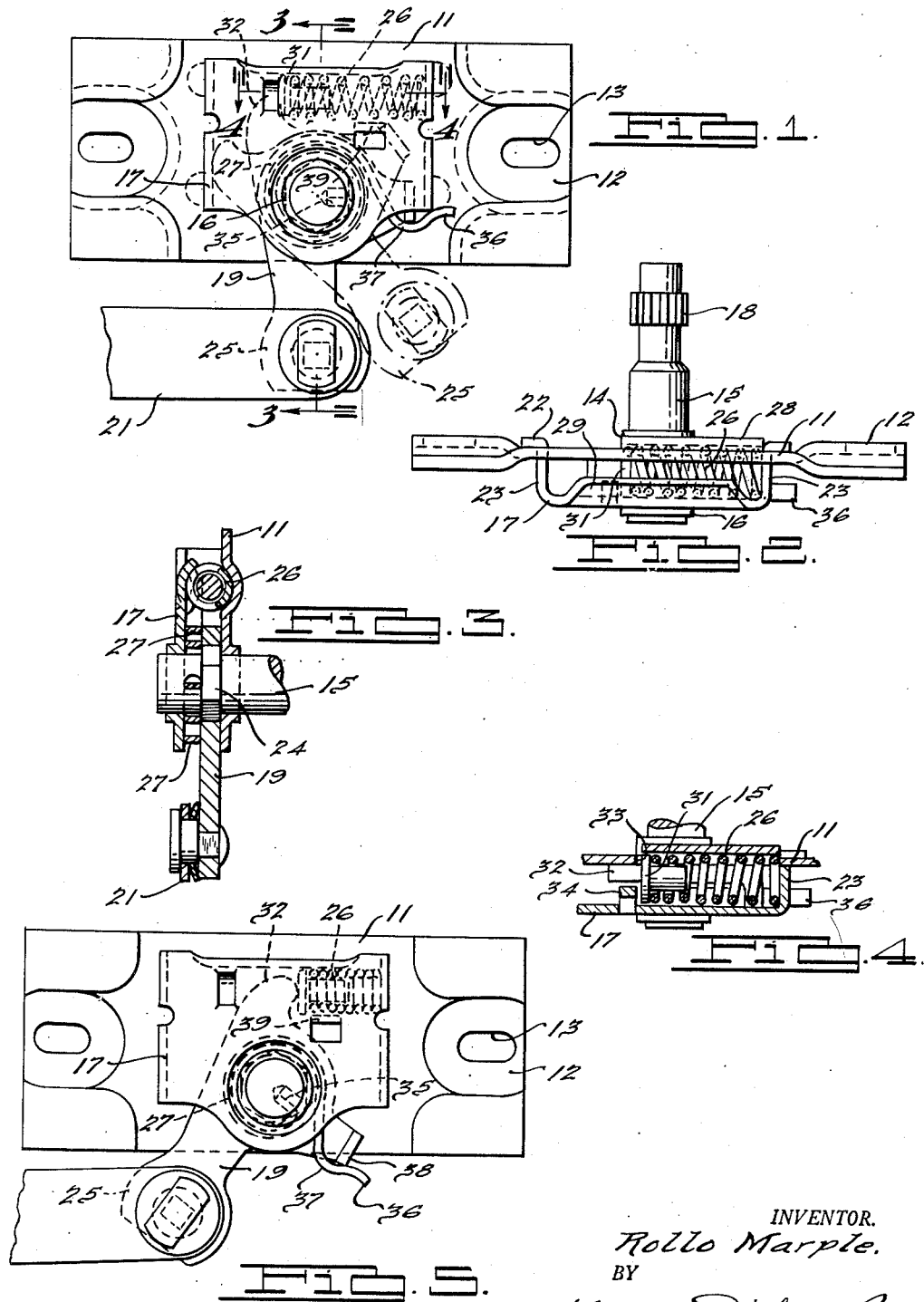

2,674,448

UNITED STATES PATENT OFFICE 2,674,448

LATCH CONTROL MECHANISM

Rollo Marple, Jackson, Mich., assignor to Hancock Manufacturing Company, Jackson, Mich., a corporation of Michigan Application August 2, 1951, Serial No. 239,984

6 Claims. (Cl. 267—1)

This invention relates to latch control mechanisms, and more particularly to mechanisms adapted, among other uses, for operating a vehicle door latch from the inside of the vehicle. This application is a continuation-in-part of application Serial No. 124,626, filed October 31, 1949, in the name of Rollo Marple.

It is an object of the present invention to provide an improved construction for controlling the movement of remote operators for actuating vehicle door latches, and especially those actuators of the type which are rockable from a neutral position in either direction for retracting the bolt dogging means or for moving the bolt locking means to its locking position.

It is another object to provide a device of the above character, which continually urges the remote operator toward a neutral position, but which is yieldable in opposite directions to permit the remote operator to retract the bolt or to lock the door, release of the remote operator permitting the instantaneous return to neutral position.

It is a further object to provide a device of the above character, which is exceedingly simple and economical in construction, and in which at least a portion of the resilient means is centrally located with respect to the remote operator shaft, whereby a minimum amount of space and number of parts are required.

Other objects, features, and advantages of the present invention will become apparent from the subsequent description taken in conjunction with the accompanying drawings.

In the drawings:

Figure 1 is a side elevational view of the improved control device, showing the actuating lock in neutral position and in one of its actuating positions.

Figure 2 is a top elevational view of the structure, showing the supporting elements for the coil spring.

Figure 3 is a cross-sectional view taken along the line 3—3 of Figure 1 and showing the mounting of the shaft and actuating lever.

Figure 4 is a fragmentary cross-sectional view taken along the line 4—4 of Figure 1, and showing the limiting stop for the coil spring; and Figure 5 is a view similar to Figure 1, but showing the actuating arm moved to its opposite actuating position.

The invention comprises a base plate 11 of generally flat configuration which may be provided with oppositely disposed attaching portions 12 having elongated slots 13 for securing the unit to the inner wall panel (not shown) of the door.

The flat central portion of base plate 11 is provided with a bearing comprising a flanged aperture 14, and a shaft 15 is rotatably supported by this bearing and by a similar flanged opening 16 in a deck plate 17 which is secured in spaced parallel relation with base plate 11. Shaft 15 is provided with a splined portion 18 adapted to receive a handle (not shown) such as the inside door operator of an automotive vehicle. Nonrotatably supported by shaft 15 is an actuating lever 19 which is adapted to be connected to a link 21 extending to the bolt mechanism (not shown) of the vehicle. This bolt mechanism may, for example, be of the type having a reciprocable member operable by the outside rollback and by the inside link 21, when moved in one direction, to release the latch dogging means, and a locking member for the reciprocable member, this locking member being operable by an outside key station, and also by the inside link 21 when this link is moved in the opposite direction. Such bolt mechanisms are well known in the art and need not be described in detail.

Shaft 15 is supported for rotational movement by the spaced journals 14 and 16, the deck plate 17 being rigidly secured to base plate 11 by means of tabs 22 which extend from the side walls 23 of the deck plate through appropriate apertures in base plate 11. The lever 19 is non-rotatably secured to the shaft 15 by means of a non-circular intermediate portion 24 on the shaft between the base plate and deck plate, the lever 19 having a corresponding opening interfitting with this enlarged non-circular shaft portion. The outer end of lever 19 extends from between the base plate and deck plate, and is preferably provided with an enlarged portion 25 for connection to link 21.

The means for resiliently urging the lever 19 into its neutral position comprises two springs 26 and 27. Spring 26 is preferably of the coil compression type, and is supported between base plate 11 and deck plate 17 by means of an elongated recess 28 in the upper portion of the base plate, and by the inturned upper edge 29 of deck plate 17. One end of the coil spring 26 abuts an end wall 23 of the deck plate, and the opposite end of this spring is provided with a button 31 which is engageable by an extension or toe 32 at the upper end of the lever 19. It will therefore be seen that spring 26 normally urges lever 19 counterclockwise and that when the lever is swung clockwise from its neutral position to the position shown in Figure 5 spring 26 will be compressed. On the other hand, the expanding movement of spring 26 is limited by a pair of stops 33 and 34 which, as shown in Figure 4, appear at the end of the supporting recess of the spring, and these stops are so disposed as to prevent spring 26 from urging lever 19 substantially past its neutral position in a counterclockwise direction.

Spring 27 is preferably of the spiral type, and surrounds shaft 15 between the base plate and deck plate, and particularly between the lever 19 and the deck plate. The inner end 35 of spring 27 is secured to shaft 15, and the outer end 36 extends outwardly and has a toe engageable with the lower edge of one side wall 23 of the deck plate. The outer end is further provided with an indentation 37 immediately inwardly of the toe, and this indentation is adapted to receive a lateral tab 38 which extends from the lever 19. The radial position of tab 38 is such that when the lever is in its neutral position, this tab will be immediately adjacent indentation 37. The expansion of spring 27 between shaft 15 and wall 23 tends to rotate shaft 15 and therefore lever 19 in a clockwise direction, but this movement is limited by the engagement of tab 38 with indentation 37, since the outer end 36 of the spring will thereafter be rotated with the inner end.

The cooperation of the various parts may perhaps best be illustrated by a description of the sequence of operations which occur when the shaft 15 is swung first counterclockwise as shown in Figure 1, and then clockwise as shown in Figure 5. Normally, the shaft for lever 19 will be held in its neutral position by the cooperative action of springs 26 and 27. In particular, spring 27, which is preferably stronger than spring 26, will hold the extension or toe 32 of lever 19 against button 31, the relative radial positions of toe 32 and tab 38 being such that slight compression of the coil spring 26 away from its stops 33 and 34 will cause tab 38 to engage the indented portion 37 of the spring. The unit will thus be prevented from rattling, since the lever 19 and its associated parts will be held in a suspended position by the two springs. When it is desired to move remote operator link 21 to the right, as shown in Figure 1, the shaft 15 is rotated counterclockwise by the handle attached to splined portion 18. When this occurs, the inner end 35 of spiral spring 27 will turn counterclockwise, but the outer portion 36 thereof will be held by the end wall 23 of deck plate 17 so that the spring 27 will be tensioned. At the same time, toe 32 will leave button 31, allowing the coil spring 26 to remain in a stationary expanded condition within its recess. The counterclockwise motion may be limited, if desired, by the engagement of tab 38 with a stop 39 extending inwardly from deck plate 17. Upon release of the handle, the spiral spring 27 will expand, rotating shaft 15 and lever 19 back to their neutral position.

When it is desired to move link 21 to the left as shown in Figure 5, the shaft 15 is rotated clockwise, causing the compression of coil spring 26 by means of toe 32 engaging button 31. At the same time, the tab 38 will engage indented portion 37 of spring 27, and since the inner end of this spring is attached to shaft 15, the entire spring will rotate as a unit with lever 19, thus offering no resistance or aid in this movement. The limit of movement in this direction may be the complete compression of spring 26. Upon release of the handle the spring 26 will expand, returning these parts to their neutral position at which point the end 36 of spring 27 will again engage end wall 23, stopping the expansion of spring 26.

It will thus be seen that a construction is provided which insures the retention of a remote operator in a neutral position, without rattling of parts, and which allows the yieldable movement of this operator in either direction. The construction is moreover of an exceedingly simple and economical character, the spiral spring 27 serving as both a resilient member and as a stop for holding the lever 19 in its neutral position. This eliminates the necessity of an extra element or elements for performing the function of holding this lever in its neutral position.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a control unit for latches or the like, an operating member mounted on said unit for movement in each of two directions from a normal intermediate position to thereby effect corresponding control operations, a resilient element mounted between said unit and said operating member for resisting the movement of said operating member in one of said directions, a second resilient element mounted between said unit and said operating member for resisting the movement of said operating member in the other direction, and a stop element carried by said operating member, said stop element being spaced from said second resilient element when said operating member is moved from its intermediate position in said other direction, said stop member being engageable with said second resilient element when moved past its intermediate position in said one direction to prevent said second resilient element from urging said operating member in said one direction.

2. The combination according to claim 1, said second resilient element being relatively stronger than said first resilient element, whereby the action of the latter element is limited to prevent its urging said operating member in said other direction past the intermediate position as determined by said stop element.

3. In a control unit for latches or the like, an operating member mounted on said unit for movement in each of two directions from a normal intermediate position, an abutment on said unit, a resilient element connected between said operating member and said abutment to yieldably resist movement of the operating member in one of said directions, a second abutment on said unit, a second resilient element connected between said operating member and said second abutment to resist movement of the operating member in the other direction, said second resilient element comprising a spring having one end connected to said operating member, and a limit stop on said operating member, said stop being spaced from said spring when said operating member is moved past its intermediate position in said other direction, said stop being engageable with the other end of said spring when said operating member is moved past its intermediate position in said one direction, whereby said spring is prevented from further urging said operating member in said one direction.

4. In a control unit for latches or the like, a mounting member, a shaft rotatably supported by said mounting member, an operating lever secured to said shaft and movable in two directions from a normal intermediate position, an abutment on said mounting member, a resilient element engageable between said operating lever and said abutment for resisting movement of the lever in one of said directions, a second resilient element for resisting the movement of said operating lever in the other direction, said second resilient element comprising a spiral spring surrounding said shaft, one end of said spring being connected to said lever, the other end of said spring being engageable with said mounting member in said other direction of movement; and a limit stop on said operating lever engageable with said other end of the spring when the operating lever is moved in said one direction past the normal position, whereby the action of said spring is limited to one side of the normal position.

5. The combination according to claim 4, further provided with a radial portion on said operating lever engageable by said first resilient element, and stop means for preventing said first resilient element from maintaining engagement with said radial portion when said operating lever is rotated against the action of said second resilient elements.

6. In a control unit for latches or the like, mounting means comprising a base plate and a deck plate secured in spaced parallel relation with said base plate, a shaft supported by said base and deck plates, an operating lever secured to said rotatable shaft and rockable from a normal intermediate position in opposite directions to effect control movements, a first resilient element comprising a coil spring supported between said base and deck plates, a radial portion on said operating lever engageable by said coil spring whereby said spring resists movement of said operating lever in one direction, a second resilient element comprising a spring surrounding said shaft, one end of said last-mentioned spring being connected to said operating lever, the opposite end of said last-mentioned spring being engageable with a portion of said mounting means when said operating lever is moved in the opposite direction, and an extension on said operating lever engageable with said opposite end of said last-mentioned spring when the operating lever is moved in said one direction past said normal position, whereby said opposite end of the last-mentioned spring is lifted away from its engagement with said mounting means.

References Cited in the file of this patent

UNITED STATES PATENTS

| Number | Name | Date |
|---|---|---|
| 357,242 | Stevens | Feb. 8, 1887 |
| 1,865,581 | Miller | July 5, 1932 |
| 2,390,984 | Bloss | Dec. 18, 1945 |
| 2,402,400 | Hewitt et al. | June 18, 1946 |

FOREIGN PATENTS

| Number | Country | Date |
|---|---|---|
| 141,762 | Austria | May 25, 1935 |